United States Patent
Beerens et al.

(10) Patent No.: US 9,426,847 B2
(45) Date of Patent: Aug. 23, 2016

(54) HEATING DEVICE

(75) Inventors: Christoph Beerens, Stuttgart (DE);
Antonio Menonna, Ditzingen (DE);
Almir Zahirovic, Stuttgart (DE)

(73) Assignee: Mahle International GmbH (DE)

( * ) Notice: Subject to any disclaimer, the term of this patent is extended or adjusted under 35 U.S.C. 154(b) by 304 days.

(21) Appl. No.: 13/994,704

(22) PCT Filed: Dec. 7, 2011

(86) PCT No.: PCT/EP2011/072009
§ 371 (c)(1),
(2), (4) Date: Sep. 3, 2013

(87) PCT Pub. No.: WO2012/080049
PCT Pub. Date: Jun. 21, 2012

(65) Prior Publication Data
US 2014/0007428 A1    Jan. 9, 2014

(30) Foreign Application Priority Data

Dec. 15, 2010  (DE) .......... 10 2010 063 142
Feb. 22, 2011  (DE) .......... 10 2011 004 530

(51) Int. Cl.
*H05B 6/40*   (2006.01)
*B23P 11/02*  (2006.01)
(Continued)

(52) U.S. Cl.
CPC ............... *H05B 6/40* (2013.01); *B23P 11/025* (2013.01); *C21D 1/42* (2013.01); *C21D 9/30* (2013.01);
(Continued)

(58) Field of Classification Search
CPC .... B23K 13/01; B23K 13/015; B23K 13/02; B23K 13/025; B23K 2201/005; B23P 11/025; B23P 11/027; B23P 2700/02; B23P 2700/07; C21D 1/42; C21D 9/30; F16C 3/10; F16C 2223/18; F16C 2226/14; F16C 2360/18; F27D 11/06; H05B 6/02; H05B 6/06; H05B 6/08; H05B 6/10; H05B 6/101; H05B 6/102; H05B 6/36; H05B 6/365; H05B 6/38; H05B 6/40; H05B 6/42; H05B 6/44; Y10T 29/17; Y10T 29/49286; Y10T 29/49293; Y10T 29/49865

See application file for complete search history.

(56) References Cited

U.S. PATENT DOCUMENTS

| 2,003 A | 3/1841 | Osdel |
| 2,004 A | 3/1841 | Harris |

(Continued)

FOREIGN PATENT DOCUMENTS

| CN | 101787415 A | 7/2010 |
| DE | 765 499 C   | 5/1953 |

(Continued)

OTHER PUBLICATIONS

Machine translation of DE765499.*

(Continued)

*Primary Examiner* — Ryan J Walters
*Assistant Examiner* — Matthew P Travers
(74) *Attorney, Agent, or Firm* — Fishman Stewart PLLC

(57) ABSTRACT

A heating device for heating a hollow component may include at least one inner induction coil and at least one outer induction coil, each configured to be heated. At least one element may be configured to influence a magnetic field formed between the inner and the outer induction coil during the operation of the heating device. The element may be arranged between the inner and the outer induction coils. Regions of the hollow component may be thinner and the thinner regions may be configured to heat more quickly than the remaining thicker regions. The thinner and thicker regions of the component may allow even heating of the component to be achieved.

20 Claims, 1 Drawing Sheet

(51) Int. Cl.
| | |
|---|---|
| *H05B 6/44* | (2006.01) |
| *H05B 6/38* | (2006.01) |
| *H05B 6/42* | (2006.01) |
| *F27D 11/06* | (2006.01) |
| *C21D 1/42* | (2006.01) |
| *H05B 6/10* | (2006.01) |
| *C21D 9/30* | (2006.01) |
| *H05B 6/36* | (2006.01) |
| *F16B 4/00* | (2006.01) |
| *F16H 53/02* | (2006.01) |

(52) U.S. Cl.
CPC .............. *F27D 11/06* (2013.01); *H05B 6/101* (2013.01); *H05B 6/365* (2013.01); *H05B 6/38* (2013.01); *H05B 6/42* (2013.01); *H05B 6/44* (2013.01); *B23P 2700/02* (2013.01); *F16B 4/006* (2013.01); *F16C 2226/14* (2013.01); *F16H 53/025* (2013.01); *Y02P 10/253* (2015.11); *Y10T 29/49293* (2015.01); *Y10T 29/49865* (2015.01)

(56) References Cited

U.S. PATENT DOCUMENTS

| | | | | |
|---|---|---|---|---|
| 2,277,223 | A * | 3/1942 | Goodridge | 266/127 |
| 2,426,053 | A * | 8/1947 | Roberds | 219/640 |
| 2,777,041 | A * | 1/1957 | Dustman | 219/672 |
| 4,100,387 | A | 7/1978 | Reinke et al. | |
| 4,694,134 | A * | 9/1987 | Ross | 219/613 |
| 4,714,809 | A | 12/1987 | Hammond et al. | |
| 5,630,958 | A * | 5/1997 | Stewart et al. | 219/670 |
| 2007/0267407 | A1* | 11/2007 | Loveless | C21D 1/42 |
| | | | | 219/661 |
| 2009/0101636 | A1* | 4/2009 | Lovens et al. | 219/645 |
| 2011/0220044 | A1* | 9/2011 | Elnick | F01L 1/047 |
| | | | | 123/90.6 |

FOREIGN PATENT DOCUMENTS

| | | |
|---|---|---|
| DE | 2538690 A1 | 3/1977 |
| DE | 10025008 A1 | 11/2001 |
| DE | 102005061920 A1 | 2/2007 |
| DE | 202009001136 U1 | 4/2009 |
| JP | S5681624 A | 7/1981 |
| JP | H10330833 A | 12/1998 |
| JP | H11210413 A | 8/1999 |
| JP | 2002-047515 A | 2/2002 |
| JP | 2002-105532 A | 4/2002 |
| JP | 2002167620 | 6/2002 |
| JP | 2002363648 A | 12/2002 |
| JP | 2008293851 A | 12/2008 |
| JP | 2009-249694 A | 10/2009 |

OTHER PUBLICATIONS

Translation of JPS56081624A, produced Nov. 2015.*
First Office Action in Chinese for CN National Phase 201180060582.7 based on PCT/EP2011/072009.
Letter from Beijing Hui & Xin IP Law Office with translation of Chinese Office Action.
English abstract for DE-10025008.
English abstract for DE-102005061920.
English abstract for JP2002-47515.
English abstract for JP2002-105532.
English abstract for JP2009-249694.
Office Action for Japanese Application No. 2013-543645, mailed Jun. 30, 2015, 4 pp.
English Abstract for JP S5681624.
English Abstract for JP H10330833.
English Abstract for JP 2008293851.
English Abstract for JP H11210413.
English Abstract for JP 2002167620.
English Abstract for JP 2002363648.

* cited by examiner

HEATING DEVICE

CROSS-REFERENCE TO RELATED APPLICATIONS

This application claims priority to German Patent Application 10 2010 063 142.6 filed Dec. 15, 2010, German Patent Application 10 2011 004 530.9 filed Feb. 22, 2011 and International Patent Application PCT/EP2011/072009 filed on Dec. 7, 2011, all of which are hereby incorporated by reference in their entirety.

TECHNICAL FIELD

The present invention relates to a heating device for heating in particular non-round, hollow components. The invention furthermore relates to a method for heating a cam with such a heating device as preparation for a joining process later on.

BACKGROUND

The thermal joining of cams to camshafts is a thoroughly known manufacturing process that has been tested for a long time, but which because of the non-round cam geometry has been resulting in difficulties time and again. For during inductive heating of the cams in particular these are heated in thin regions, i.e. for example in the region of a base circle, significantly more quickly and significantly higher than in the region of the maximum cam height, which could result in a non-round joint and in a partially major distortion of the heated cam. This always caused higher temperatures or larger expansions on the base circle, but which caused a drop in hardness which could cause problems on the finished cam in the case of higher hardnesses. As is known, cams are asymmetrical components which could merely be unevenly, i.e. irregularly heated, with previous symmetrical coils as heating devices known from the previous prior art. Alternatively to this, asymmetrically shaped coils adapted to a respective cam can be employed, but which are expensive.

SUMMARY

The present invention deals with the problem of stating a heating device for heating in particular non-round, hollow components, for example cams, with which the disadvantages known from the prior art can be avoided.

According to the invention, this problem is solved through the subjects of the independent claims. Advantageous embodiments are subject of the dependent claims.

The present invention is based on the general idea of heating asymmetrical components dependent on the thickness and thus evenly, wherein a heating device for heating non-round (otherwise referred to as "non-circular"), hollow components, such as for example cams, is equipped with at least one inner induction coil penetrating the component to be heated and/or an outer induction coil surrounding the component to be heated and wherein in those regions of the component to be heated which heat up more quickly than the remaining regions, for example because they are thinner, at least one element influencing a magnetic field forming during the operation of the heating device is positioned between the inner/outer induction coil and the component to be heated, and/or wherein in those regions of the component to be heated, which are heated more slowly than the remaining regions, for example because they are thicker, such an element is positioned within the inner induction coil and/or outside the outer induction coil, which weakens or intensifies the magnetic field in this region and because of this makes possible an even heating of the non-round component. Thus, an inner or an outer induction coil or cumulatively both an inner as well as an outer induction coil can be alternatively provided, wherein in each case between the inner and the outer induction coil and/or within the inner induction coil and/or outside the outer induction coil at least one element (shielding/intensifying element) can be arranged. With the at least one element, the regions which are heated up more quickly can thus be shielded or the magnetic field in the regions which are heated more slowly, intensified and because of this a particularly even heating of the component achieved. In connection with the even heating of the component, i.e. for example of the cam, a round joint can be achieved during the thermal joining with the camshaft later on, as a result of which the quality of the thermal joining can be improved. In addition to this, the component to be heated is heated less intensively as a whole, in particular in the shielded regions, which for example with components formed as cams leads to a significantly lower tempering effect and thus a drop in hardness. With the heating device according to the invention, a preferentially completely even heating of the cam is thus possible independently of its regions. The major advantage of the heating device according to the invention in particular is that no complex and expensive shaped coils are required, but easy-to-wind induction coils can be used.

In an advantageous further development of the solution according to the invention, the at least one element is adjustable in particular electrically, pneumatically or hydraulically. Such an adjustable element on the one hand facilitates the heating process, since it is moved into position for example only once the component to be heated has been placed in the heating device. At the same time it is also conceivable that the element is formed in such a manner that it is adjustable during the heating process, as a result of which during the heating, the heating process can be individually influenced through adjusting the element and thereby a temperature distribution within the component to be heated.

Practically, the element is formed of copper, of aluminium or of a plastic with embedded soft-iron components. Copper as well as aluminium are good thermally as well as electrically conductive materials, while other materials, which are likewise good thermally and electrically conductive materials, are conceivable for use with the element. For the plastic solution, in particular thermoplastic high-performance plastics with a homogeneous filling with soft iron particles are possible, by means of which the local shielding or the local concentration of magnetic fields is possible. Such ferromagnetic plastics in this case can be employed in particular in frequency ranges from 3 kHz to 3 MHz and with magnetic permeabilities between 7 and 120 mμ. Owing to the homogeneous distribution of the soft iron particles in the plastic matrix, preferentially isotropic magnetic properties are preferentially achieved in addition.

In a further advantageous embodiment of the solution according to the invention, the outer induction coil and/or the inner induction coil are embedded in a casting compound, wherein the outer induction coil, the inner induction coil, in particular the associated casting compounds and/or the at least one element are cooled. The individual cooling of individual components of the heating device according to the invention makes possible a control to suit requirements, as a result of which the temperature of the component to be heated can be individually influenced in particular. At the same time, such cooled components make possible an even heating process independently of the number of the components to be heated, as a result of which a continuously high-quality production can be achieved.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more details in the following description, wherein same reference characters relate to same or similar or functionally same components.

BRIEF DESCRIPTION OF THE DRAWINGS

There it shows, in each case schematically.

DETAILED DESCRIPTION

Figure 1:
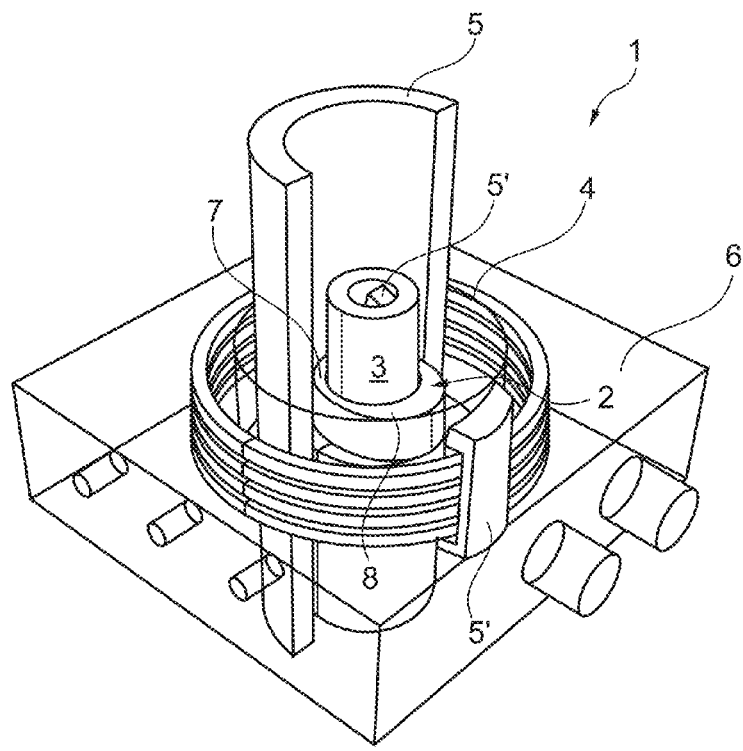
FIG. 1 a heating device according to the invention for heating in particular non-round, hollow components, FIG. 2*a* a cam heated by the heating device according to the invention, FIG. 2*b* a cam heated by means of a conventional heating device.

According to FIG. 1, a heating device 1 according to the invention for the heating of asymmetrical, in particular non-round, hollow components 2, as for example a cam, comprises at least one inner induction coil 3 penetrating the component 2 to be heated and/or an outer induction coil 4 surrounding the component 2 to be heated. Additionally, the heating device 1 according to the invention comprises at least one element 5, which in regions of the component 2 to be heated, which are heated more quickly than the remaining regions, for example because they are thinner, is positioned between the respective induction coil 3, 4 and the component 2 to be heated. According to the invention, the at least one element 5 is positioned between the inner/outer induction coil 3, 4 and the component 2 and in the process weakens the magnetic field generated in this region between the inner induction coil 3 and/or the outer induction coil 4 during the operation of the heating device 1. Because of this, comparatively even heating of the component 2, i.e. for example of the cam is possible, as a result of which a particularly even joining with little distortion in the component 2 to be heated can be achieved.

Additionally or alternatively to this, an element 5' influencing the magnetic field being generated during the operation of the heating device 1 can be positioned in regions of the component 2 to be heated which are heated up more slowly than the remaining regions, for example because they are thicker, within the inner induction coil 3 and/or outside the outer induction coil 4 and because of this intensify the magnetic field in this region, as a result of which a comparatively even heating can likewise be achieved. The element 5' thus acts as a concentrator, which intensifies the magnetic field in this region and because of this intensifies the heating.

As already mentioned, the component 2 to be heated can for example be a cam for a camshaft, wherein the outer induction coil 4 according to FIG. 1 is embedded in a casting compound 6. In the same way, the inner induction coil 3 can obviously also be embedded in such a casting compound. In addition it is conceivable that the outer induction coil 4, the inner induction coil 3, in particular its casting compounds 6, and/or the at least one element 5, 5' can be cooled.

To individually influence the heating process, the at least one element 5, 5' can be additionally adjusted, for example electrically, pneumatically or hydraulically. As is evident from FIG. 1, the element 5 according to the invention has a channel-like shape and because of this shields in particular a base circle 7 (see FIG. 2*a, b*) of the component 2 to be heated. The element 5, 5' can for example be formed of copper or aluminium, but should have a good thermal and electrical conductivity in all cases. In general, the element 5, 5' can also be formed of a plastic with embedded soft iron parts, wherein in this case in particular thermoplastic high-performance plastics with a homogeneous filling with soft iron particles can be considered, by means of which the local shielding or the local concentration of magnetic fields is possible. Such ferromagnetic plastics can be employed in wide frequency ranges and magnetic permeabilities and because of the homogeneous distribution of the soft iron particles in the plastic matrix additionally achieve isotropic magnetic properties. The mentioned plastics cannot only be cost-effectively produced but also manufactured easily, in particular through cutting and without subsequent grinding rework and can be cast/injection moulded in suitable moulds in almost any shapes.

Figure 2:
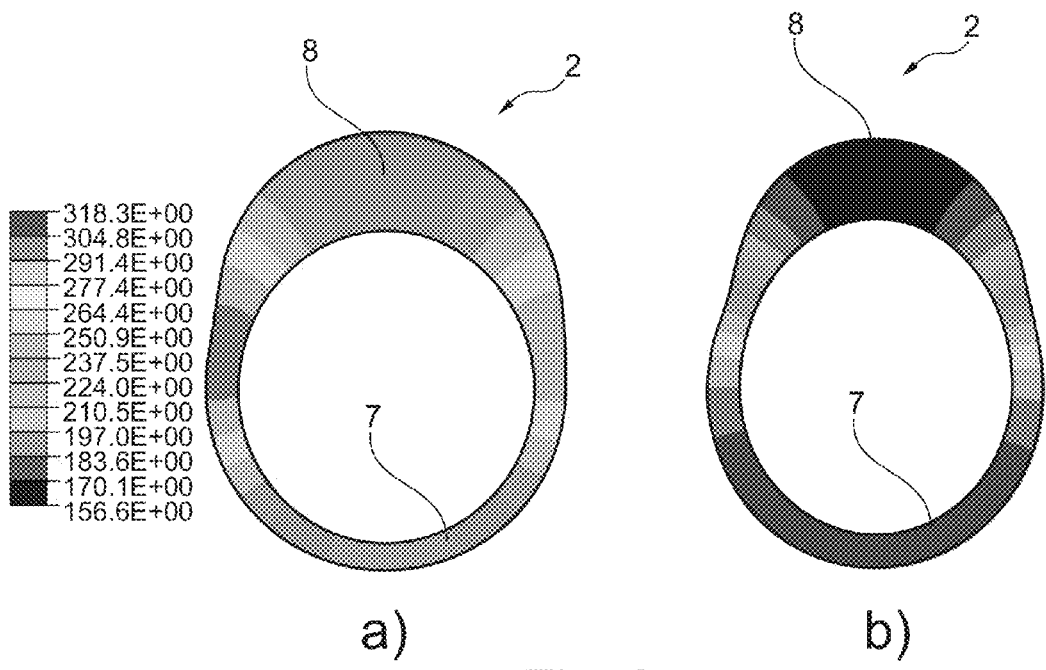

Considering FIG. 2*a* compared with FIG. 2*b* it is evident that in FIG. 2*a* a significantly smaller temperature differential over the circumference of the component 2 to be heated, which in this case is formed as a cam, can be observed. In FIG. 2*b*, a cam elevation 8 for example has a significantly lower temperature than the base circle 7, which is accompanied by a clearly greater distortion. In order to be able to raise the cam elevation 8 according to FIG. 2*b* to the temperature level as in FIG. 2*a*, the base circle 7 would have to be heated significantly higher, which however would be accompanied by a tempering and thus an undesirable drop in hardness.

With the heating device 1 according to the invention, a cam can thus be heated comparatively evenly, i.e. regularly, as a result of which in particular a joining process to a camshaft which is not shown later on is simplified and improved, but at any rate an undesirable drop in hardness on the base circle 7 through excessive heating can be avoided. The element 5, 5', which for example is formed as a shielding/reinforcement plate, in this case shields the base circle 7 and/or intensifies the magnetic field in the region of the cam elevation 8, so that the base circle 7 as a consequence heats up significantly less intensively and the cam elevation 8 heats up significantly more intensively. The even heating of the cam in this case can for example be visualised via a corresponding hardness profile or corresponding tempering colours.

With the elements 5, 5' according to the invention, the magnetic field bringing about the heating-up can be shielded or intensified, as a result of which the heating process is exactly controllable and in particular makes possible a high-quality joining of cams to a camshaft. It is particularly advantageous, moreover, that the heating device 1 can be easily adapted to changing component geometries of components 2 to be heated such as for example cams, through a simple use of different elements 5, 5' without having to change anything on the induction coils 3, 4.

The invention claimed is:

1. A heating device for heating a hollow component, comprising:
    at least one inner induction coil penetrating the component and configured to be heated, at least one outer induction coil surrounding the component and configured to be heated, wherein the at least one inner induction coil and the at least one outer induction coil each include a circular multi-turn coil arranged coaxially with the component, and wherein the component includes an asymmetric heat profile including at least a first heatable region and a second heatable region, and wherein the first heatable region heats more quickly than the second heatable region,
    at least one element disposed at least one of in a first position corresponding to the first heatable region and in a second position corresponding to the second heatable region, wherein the at least one element respectively is configured to influence a magnetic field forming between the inner and the outer induction coil during the operation of the heating device,
    wherein the at least one element in the first position is arranged between the inner and the outer induction coils and weakens the magnetic field in the first heatable region, and
    the at least one element in the second position is arranged at least one of within the inner induction coil and exterior to the outer coil with respect to the component and is configured to intensify the magnetic field in the second heatable region, wherein the at least one element facilitates even heating of the asymmetric heat profile of the component in response to being in the at least one of the first position and the second position during the operation of the heating device.

2. The heating device according to claim 1, wherein the component is a cam for a camshaft.

3. The heating device according to claim 1, wherein at least one of the outer induction coil and the inner induction coil is embedded in a casting compound.

4. The heating device according to claim 3, wherein at least one of the outer induction coil, the inner induction coil, and the at least one element is cooled.

5. The heating device according claim 1, wherein the at least one element is adjustable at least one of electrically, pneumatically and hydraulically.

6. The heating device according to claim 1, wherein the at least one element has at least one of a channel-like and a clamp-like shape.

7. The heating device according to claim 1, wherein the at least one element is formed of at least one of copper, aluminium, and plastic with embedded soft iron parts.

8. The heating device according to claim 1, wherein the circular multi-turn coil of the inner induction coil is arranged in the component.

9. The heating device according claim 8, wherein the at least one element is adjustable at least one of electrically, pneumatically and hydraulically.

10. The heating device according to claim 9, wherein the at least one element has at least one of a channel-like and a clamp-like shape.

11. The heating device according to claim 1, wherein the at least one element is disposed in the first position and weakens the magnetic field in the first heatable region a sufficient amount during operation of the heating device to facilitate even heating between at least the first heatable region and the second heatable region.

12. The heating device according to claim 11, wherein the at least one element is a first element, further comprising a second element disposed in the second position, wherein the second element intensifies the magnetic field in the second heatable region and facilitates even heating between the first heatable region and the second heatable region during operation of the heating device.

13. The heating device according to claim 1, wherein the at least one inner induction coil and the at least one outer induction coil are each symmetrical.

14. The heating device according to claim 1, wherein the first heatable region corresponds to a base circle having a first thickness and the second heatable region corresponds to an elevation having a second thickness greater than the first thickness of the base circle, and wherein the at least one element facilitates even heating throughout at least the first thickness of the base circle and the second thickness of the elevation in response to being in the at least one of the first position and the second position during the operation of the heating device.

15. A method for heating a hollow component having a non-circular geometry, comprising:
    threading the component onto an inner induction coil surrounded by an outer induction coil, wherein the inner induction coil and the outer induction coil each include a circular multi-turn coil, and wherein the circular multi-turn coil of the inner induction coil is arranged in the component,
    positioning at least one element in a region of a base circle of the component between at least one of the induction coils and the component to influence a magnetic field being generated during the operation of a heating device, wherein the base circle has a first thickness less than a second thickness spaced away from the base circle, and
    energizing the inner induction coil and the outer induction coil to generate the magnetic field, wherein the magnetic field in the region of the base circle is weakened via the at least one element a sufficient amount to facilitate even heating of the component.

16. The method according to claim 15, wherein the hollow component is a cam, further comprising removing the heated cam from the heating device and threading onto a camshaft.

17. The method according to claim 15, wherein the at least one element includes a first element arranged angularly aligned with the base circle, further comprising positioning at least one second element angularly aligned with an elevation at least one of within the inner induction coil and outside the outer induction coil for influencing the magnetic field being generated via the inner induction coil and the outer induction coil during the operation of the heating device, wherein the elevation includes the second thickness greater than the first thickness, and wherein the magnetic field in a region of the elevation is intensified via the at least one second element to facilitate even heating of the component.

18. The method according to claim 15, wherein the circular multi-turn coil of the inner induction coil and the outer induction coil are arranged coaxially with the component.

19. A method for heating a cam, comprising:
    threading the cam onto an inner induction coil surrounded by an outer induction coil, wherein the inner induction coil and the outer induction coil each include a circular multi-turn coil arranged coaxially to the cam, and wherein the circular multi-turn coil of the inner induction coil is arranged in the cam, and positioning at least one element in a region of a cam elevation within the inner induction coil for influencing a magnetic field being generated during the operation of a heating device, wherein the cam elevation has a first thickness greater than a second thickness spaced away from the cam elevation, energizing the inner and outer induction coils to generate the magnetic field, wherein the magnetic field in the region of the cam elevation is intensified via the at least one element and facilitates even heating of the cam.

20. The method according to claim 19, wherein the at least one element includes a first element arranged angularly aligned with the cam elevation, further comprising positioning at least one second element angularly aligned with a base circle of the cam between at least one of the induction coils and the cam, wherein the magnetic field in a region of the base circle is weakened via the at least one second element for facilitating even heating of the cam.

* * * * *